Sept. 19, 1967  J. S. KAMBORIAN  3,342,624
METHOD AND APPARATUS FOR COATING SHOE PARTS
Filed May 11, 1964  6 Sheets-Sheet 4

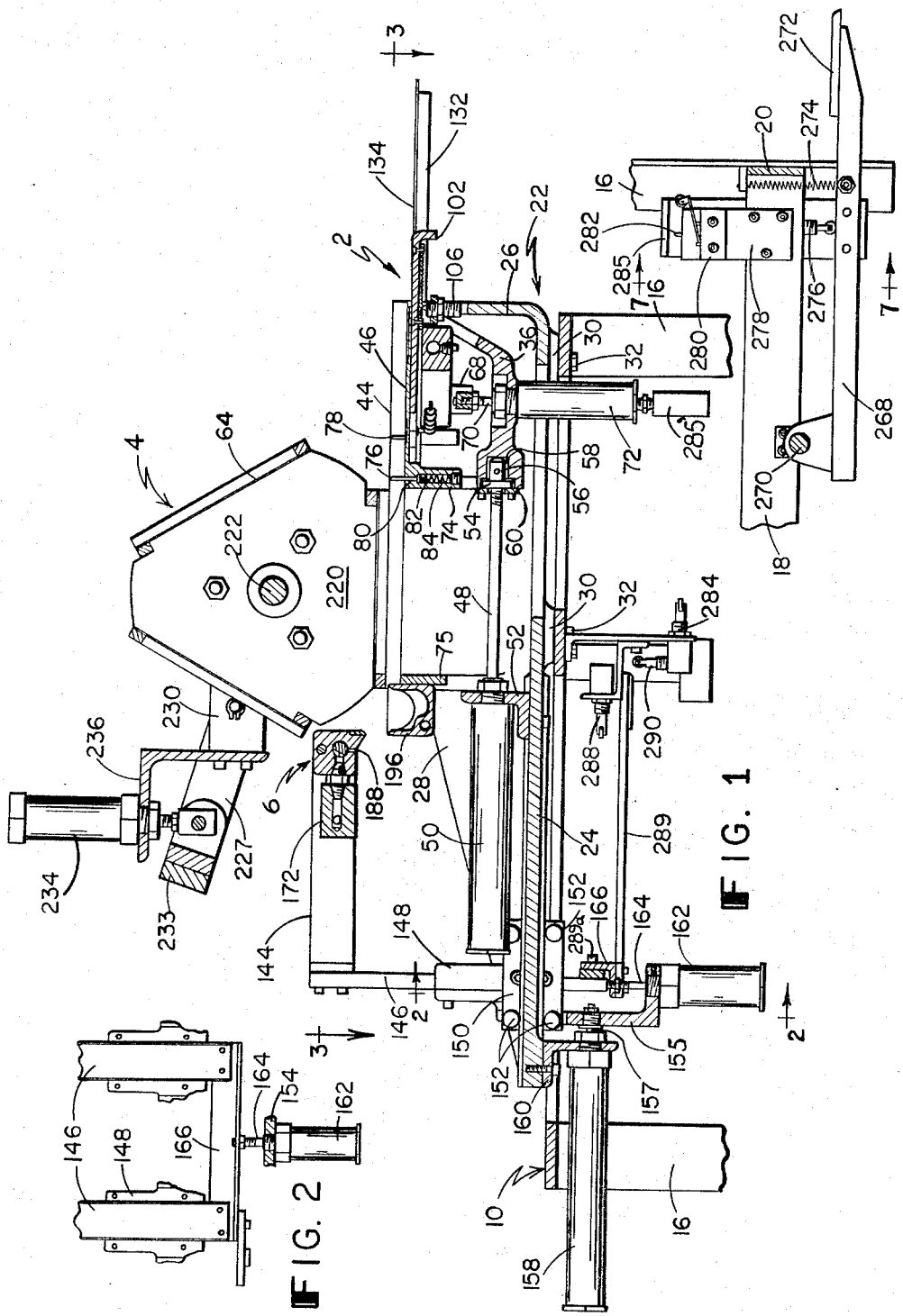

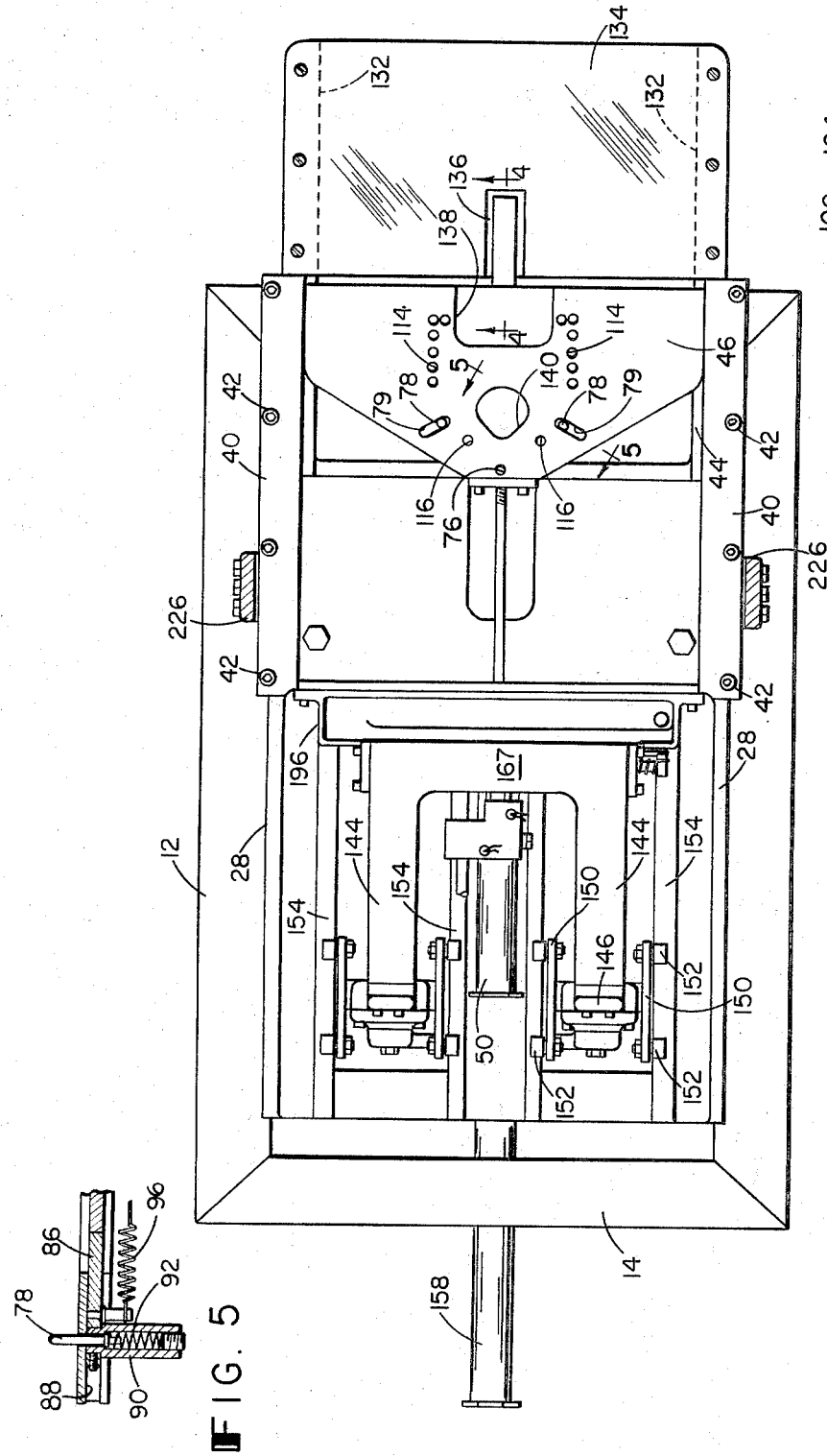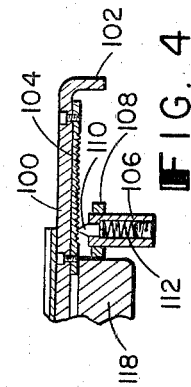

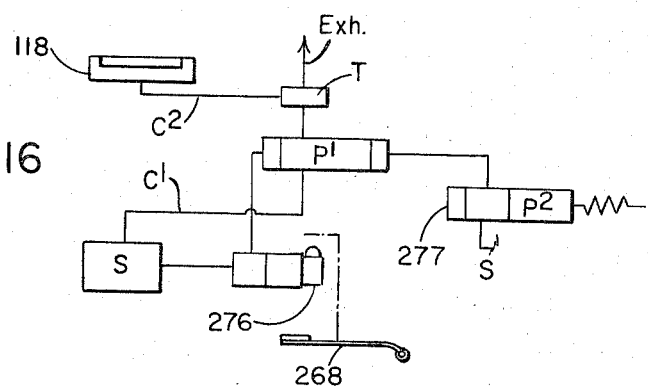
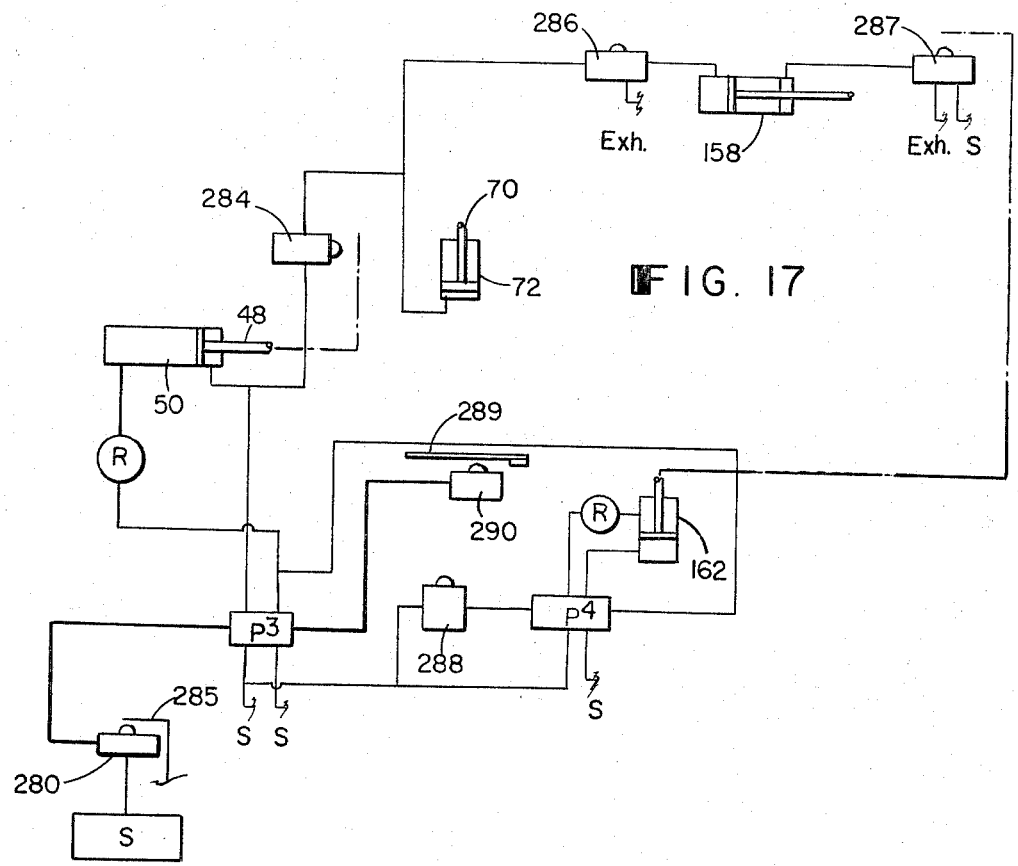

United States Patent Office 3,342,624
Patented Sept. 19, 1967

3,342,624
METHOD AND APPARATUS FOR COATING
SHOE PARTS
Jacob S. Kamborian, 70 Crestwood Road,
West Newton, Mass. 02165
Filed May 11, 1964, Ser. No. 366,513
24 Claims. (Cl. 117—38)

This invention relates to shoe manufacture and especially to a machine and method for applying a thermoplastic or similar stiffening material to normally flexible shoe parts to make them stiffly resistant to deformation and shape-retaining, and, in particular, to provide a stiffened area whose stiffness varies at different locations to provide maximum stiffness in the area which will be subjected to the most severe stress. It is within the scope of the invention however to employ the machine and method for applying a liquid coating material of any suitable kind in uniform or varying degrees of thickness to other than shoe parts.

It is customary to apply a thermoplastic stiffener to the interior of the forepart of a shoe upper, whether of leather or fabric, which is substantially uniformly thick throughout the major portion of its area, prior to lasting, to provide a stiffening layer which will resist crushing and deformation. An object of this invention is to apply a stiffening layer of the foregoing kind but which has a relatively narrow area transversely thereof along the rear edge which tapers to feather thickness to avoid the presence of a visible transverse rib on the finished side of the upper and which has added thickness throughout a small area at the crown of the tip capable of withstanding severe pressures without breakdown.

Further objects of the invention are to provide a machine for applying a liquid stiffener material of varying thickness to shoe parts rapidly and semiautomatically by the simple expedient of placing the shoe part on a work support and initiating a cycle of operation of the machine whereupon the shoe part will be coated and discharged for use; to provide a machine adapted to apply a liquid stiffener material to shoe parts of different size; to provide a machine which is economical of stiffener material; and to provide a machine which is of simple construction, easy to operate, clean and durable. Other objects are to provide a method of applying a liquid stiffener to a shoe part to obtain the characteristics referred to above, and a shoe part embodying these characteristics.

As herein illustrated, the machine comprises essentially a work support upon which a work piece may be placed, a combined applicator and doctor, and a stencil plate containing an opening corresponding in area and shape to the part of the shoe to which the coating is to be applied, arranged in operative relation to each other and provided with motivating means which enables moving the support to position the work piece resting thereon in engagement with the underside of the stencil plate, moving the combined applicator and doctor across the stencil plate in one direction, while held above the plate, to lay down a surplus of coating material on the plate and the area of the part exposed through the opening, and then moving in the opposite direction, while the doctor is yieldably pressed against the plate, to remove the excess coating material, leaving the portion of the part exposed through the stencil opening covered with a coating material corresponding substantially in thickness to the depth of the opening. The shoe part is positioned on the work support so as to be moved into a position coinciding with the stencil opening by yieldable positioning pins, one at the tip and one at each side, the latter being adjustable, and is held on the support during movement of the support into position beneath the stencil by establishing a sub-atmospheric pressure beneath the shoe part through openings in the work support which are in communication with a vacuum chamber at the underside of the work support. The stencil plate, for the purposes herein contemplated, contains an opening which has straight and curved sides adapted to be positioned with the straight side crosswise of the toe of the shoe part and the curved side spaced from and paralleling the curved edge of the toe.

In accordance with the invention, the upper surface of the stencil plate contains a shallow recess which extends transversely of the straight edge of the opening and decreases in depth rearwardly from the straight edge toward the curved edge so that, as the doctor travels over the surface of the stencil plate, a coating is applied to the exposed portion of the shoe part which is thin along the straight edge, which is at the rear end of the toe, and increases in thickness toward the tip of the toe. The work support contains a shallow concave depression rearwardly of the recessed portion of the stencil plate which provides for an increase in thickness of the relatively small area of the shoe part adjacent the tip by sinking of this portion of the shoe part into the depression as the doctor moves over it. Sinking of the shoe part into the depression is augmented by the low pressure at the underside of the shoe part employed to hold the latter on the work support. There are three stencil plates and these are mounted on a supporting rotor for rotation of the stencil plate of proper size into parallel relation to the work support.

The method of applying the stiffening material to the shoe part comprises holding the shoe part against one side of a stencil plate containing a stencil opening of the desired area, applying a surplus of coating material to the other side of the stencil plate to cover the plate and the portion of the shoe part exposed through the opening, and then removing the surplus material by scraping it from the plate so as to leave a coating applied to the shoe part corresponding substantially in thickness to the depth of the stencil opening. In accordance with the method, the portion of the coating of stiffener which is to be made thinner is formed by removing a greater amount of the coating material from the area and the portion that is to be made thicker is formed by removing a lesser amount of coating material from the area during the scraping and removal of the surplus coating material. This is achieved by forming a recess in the upper surface of the stencil plate so that the doctor, by means of which the surplus coating material is removed, is closer to the exposed surface of the shoe part exposed through the opening in this area, and by providing a depression in the work support where the thicker coating is desired so that the area of the shoe part to which the thicker coating is to be applied is pressed into it by the doctor as the latter is moved across this area. Depression of the shoe part into the recess is augmented by lowering the pressure beneath the shoe part.

The invention will now be described in greater detail with reference to the accompanying drawings wherein:

FIG. 1 is a side elevation of the machine, sectioned in part and broken away in part to permit including the treadle mechanism for initiating operation of the machine at the bottom;

FIG. 2 is a transverse section taken on the line 2—2 of FIG. 1;

FIG. 3 is a plan view of FIG. 1, with the stencil support omitted, taken on the line 3—3 of FIG. 1;

FIG. 4 is a fragmentary vertical section taken on the line 4—4 of FIG. 3;

FIG. 5 is a fragmentary vertical section taken on the line 5—5 of FIG. 3;

FIG. 16 is a diagram of the vacuum-producing means for lowering the pressure at the underside of the work support to hold the work on the work support; and FIG. 17 is a diagram of the pneumatic control for the machine.

Figure 6:
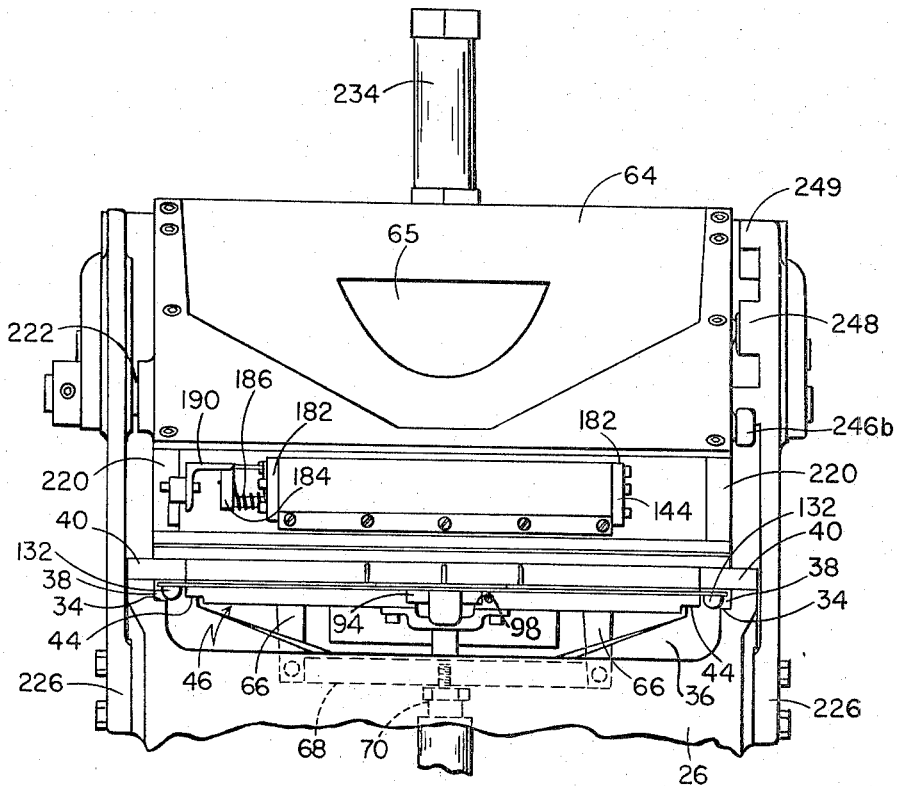
FIG. 6 is a front elevation of the machine with the lower part of the supporting structure omitted.

Referring to the drawings (FIG. 1), the machine comprises a work support 2, stencil-supporting rotor 4, and a combined applicator and doctor 6 arranged on a supporting frame 10 together with suitable motors and connecting mechanism to enable cyclical operation of the machine, wherein initiation of operation of the machine will be followed by movement of the work support with a work piece resting thereon into a position beneath a stencil plate, movement of the combined applicator and doctor forwardly to apply a surplus of coating material to the portion of the work exposed through the stencil opening, movement of the combined applicator and doctor rearwardly while yieldingly held against the stencil plate to remove the surplus coating material, elevation of the combined applicator and doctor from the work to its initial position, and forward movement of the work support to permit removal of the work piece therefrom.

The supporting frame 10 has spaced parallel, longitudinally extending parts 12 joined at their opposite ends to each other by spaced parallel, transversely extending parts 14 to form a rigid hollow frame, and is provided at its four corners with vertically disposed legs 16. The lower ends of the legs 16 are joined longitudinally by reinforcing members 18 and transversely by reinforcing members 20. A hollow casting 22 (FIG. 1), having a flat bottom wall 24, a vertical front end wall 26 and spaced parallel, vertical side walls 28 is mounted on the supporting frame and supported thereon by bosses 30 on the lower side of the bottom wall into which bolts 32 are screwed. The inner sides of the side walls 28 contain horizontal shoulders 34 (FIG. 6) lengthwise thereof, and a carriage member 36 having spaced parallel, laterally projecting flanges 38 is mounted between the walls on the shoulders 34 so as to be slidable horizontally, rearwardly and forwardly. Gibs 40 (FIG. 3) are fastened by bolts 42 to the upper edges of the walls 28 so as to overlie the flanges 38 and hence to hold the carriage in place. The carriage, in turn, has transversely spaced, horizontally disposed, spaced parallel shoulders 44 for receiving and supporting the opposite longitudinal edges of a rigid work-supporting plate 46 (FIG. 3). Reciprocable movement of the carriage 36 and the work-supporting plate 46 is effected by a piston rod 48 connected to the carriage 36 at one end and to a piston (not shown) situated in a motor cylinder 50, the latter being fastened to a transverse bracket 52 secured to the bottom of the casting 22. The forward end of the rod 48 has on it a washer 54 secured thereto by a nut 56 situated in a recess 58 in the rear side of the carriage and held therein by a face plate 60 bolted over the recess.

Figure 8:
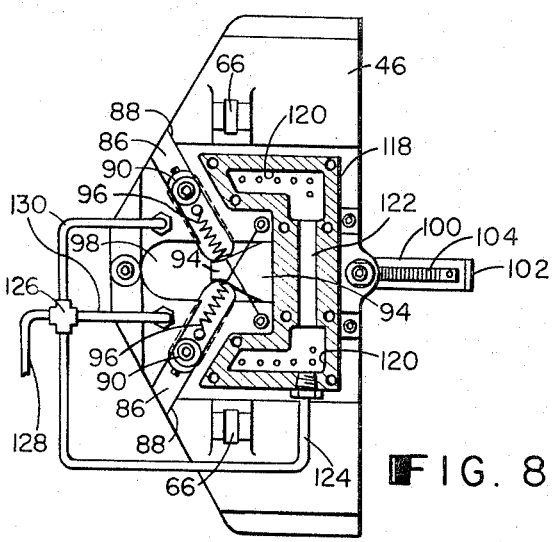
FIG. 8 is a horizontal section taken through the work support just below the work-supporting surface.

The work-supporting plate 46 is adapted, by rearward movement, to bring a piece of work supported thereon beneath the stencil-supporting rotor 4 which, as will be described hereinafter, provides support for a plurality of stencil plates 64 having openings 65 of different size which may be selectively moved into a position parallel to the work-supporting plate. The selected stencil plate 64, in operative position, rests on the upper edges of the walls 28 (FIG. 1) and in order to bring the work resting on the work-supporting plate into engagement with the underside of the stencil plate, the work-supporting plate is raised into engagement therewith. To this end, transversely spaced legs 66 (FIGS. 6 and 8) are secured to the underside of the work-supporting plate 46 and these are joined by a transverse bar 68, to the center of which is secured the upper protruding end of a piston rod 70, the lower end of which has on it a piston (not shown) situated in a motor cylinder 72. The motor cylinder 72 is supported in a vertical position on the bottom of the carriage 36 and is movable therewith. The bottom of the casting is cut away to permit the motor cylinder 72 to project downwardly through it and to permit it to move rearwardly.

The work-supporting plate 46 has at its rear end a downwardly projecting, transversely extending flange 74 which limits rearward movement of the work-supporting plate by contact with a transversely extending bar 75 secured between the walls of the casting and provides guide means in conjunction with the opposite edges of the work-supporting plate and the gibs 40 during vertical movement.

In order to locate the work piece on the work-supporting plate so that it will be in the proper position with respect to the stencil opening when moved beneath the stencil plate, three pins (FIG. 3), a centrally located pin 76 and two transversely spaced locating pins 78 are mounted on the supporting plate. The lower end of the pin 76 (FIG. 1) extends through an opening 80 into a vertical bore 82 in the flange 74 and is normally held elevated, that is, projecting upwardly from the upper surface of the supporting plate by a coiled spring 84 situated in the bore. The pins 78 are adjustable angularly, transversely, in slots 79 formed in the work-supporting plate which diverge rearwardly. Adjustment is provided for by slides 86 mounted in grooves 88 at the underside of the work-supporting plate (FIG. 8), to each of which is secured a hollow sleeve 90 (FIG. 5) into which the lower end of the pin 78 projects and is yieldably supported by a coiled spring 92. The inner ends of the slides 86 are held engaged with the inclined edges of a wedge-shaped cam 94 by coiled springs 96 secured at their ends to the slides and to the underside of the work-supporting plate. The wedge-shaped cam 94 is slidably mounted in a slot 98 (FIG. 6) in the work-supporting plate and has a forwardly extending part 100 which terminates in a downwardly projecting lip 102, the latter providing convenient means for grasping the part 100 to facilitate pushing the cam 94 forwardly or rearwardly relative to the slides 86 and hence to adjust the position of the pins 78. To hold the cam 94 in a selected position a rack bar 104 (FIGS. 1 and 8) is fastened to the underside of the part 100, a sleeve 106 (FIGS. 1 and 4) is secured in a vertical position by means of a bracket 108 below the part 100, and a detent 110 is mounted in the upper end of the sleeve and is held engaged with the rack bar by a coiled spring 112 mounted in the sleeve below the detent.

In order to hold the shoe part on the work support during rearward movement thereof, to a position below the stencil plate, a plurality of holes 114 and 116 (FIG. 3) are formed in the plate and a low pressure is maintained beneath the work-supporting plate by means of a manifold 118 (FIG. 8) formed on the lower side of the work-supporting plate, comprising transversely disposed chambers 120 subjacent the openings 114, interconnected by a transverse passage 122. A conductor 124 is connected to one of the chambers 120 and by a coupling 126 to a vacuum-producing means or vacuum chamber by a conduit 128. The holes 116 are individually connected to the coupling 126 by pipes 130.

For convenience, the carriage 36 has projecting forwardly therefrom a pair of transversely spaced bars 132 (FIGS. 1 and 3), across which there is mounted an apron 134 for supporting a stack of work pieces preparatory to placing the work on the work-supporting plate. The apron 134 contains an opening 136 for accommodating the part 100.

The upper surface of the work-supporting plate 46 contains midway between its opposite edges two relatively shallow recesses 138 and 140, the purpose of which will be described hereinafter.

Figure 9:
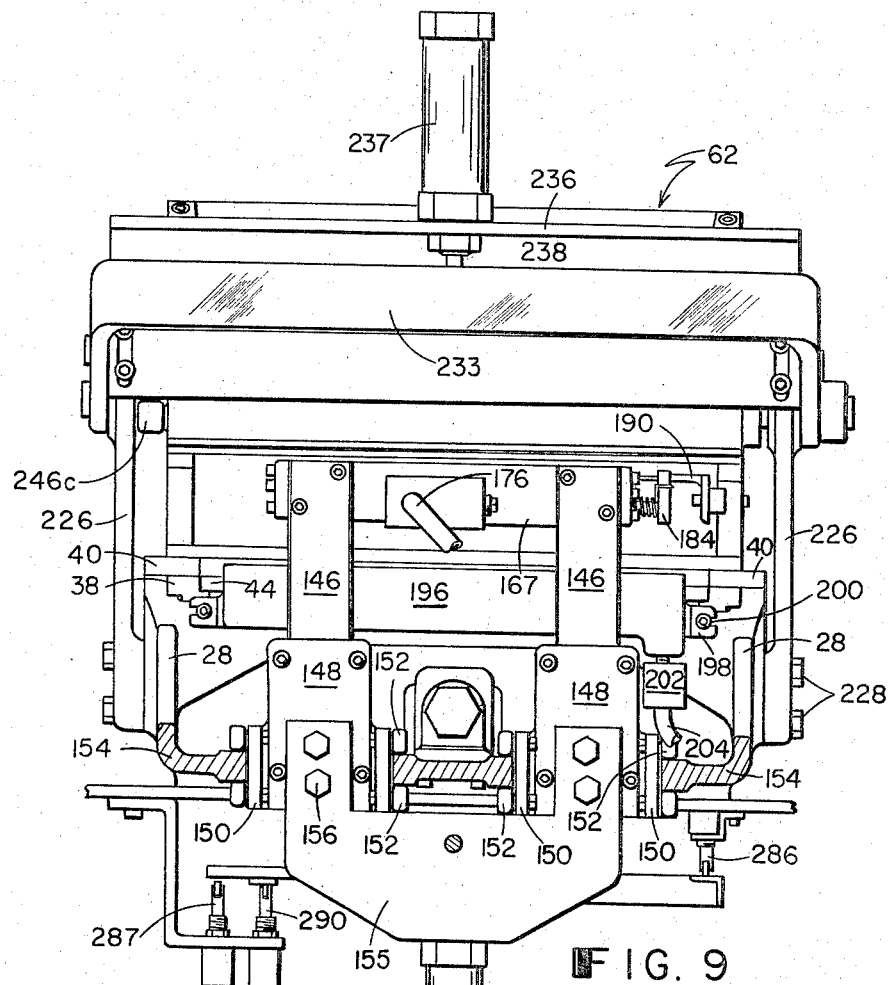
FIG. 9 is a rear elevation of the machine omitting the supporting structure.

The combination applicator and doctor 6 (FIGS. 1 and 10) is supported rearwardly of the rearmost position of the work-supporting plate when the latter is beneath the stencil plate, for movement forwardly above the stencil plate, to lay down a coating of material on the surface of the stencil plate and the exposed surface of the work within the stencil opening, downwardly into engagement with the stencil plate at the forward side of the stencil opening, rearwardly to remove the excess coating material, and upwardly to its initial position preparatory to the next cycle of operation. The combined applicator and doctor is supported for the aforesaid movement between the forward ends of a pair of transversely spaced arms 144 (FIG. 3), the rear ends of which are secured to the upper ends of a pair of transversely spaced, vertically disposed posts 146. The lower ends of the posts 146 are slidably mounted in vertically disposed sleeves 148, the latter being secured at their lower ends between spaced parallel carriage bars 150 (FIGS. 1 and 3). The carriage bars 150 have rotatably mounted pairs of vertically spaced rollers 152 which, by engagement with the upper and lower tracks 154 (FIG. 9), formed lengthwise of the bottom wall 24, provide means for supporting and guiding the combined applicator and doctor for movement forwardly and rearwardly relative to the stencil plate. A bracket 155, secured to the sleeves 148 by bolts 156, extends downwardly below the casting and is connected to the forward end of a piston rod 157 of a motor cylinder 158, the latter being secured in a horizontal position to the underside of the casting by a bracket 160. A cylinder 162, secured in a vertical position to the bracket 155 and provided with a rod 164 which is connected to an angle bar 166 (FIG. 2), provides for moving the posts 146 vertically and hence movement of the combined applicator and doctor 6 into and out of engagement with the stencil plate. The pneumatic motor 162 operates to hold the doctor yieldably engaged with the stencil during its scraping action. The blade may be kept heated if necessary by incorporating a heating element in the support for the doctor.

Figure 14:
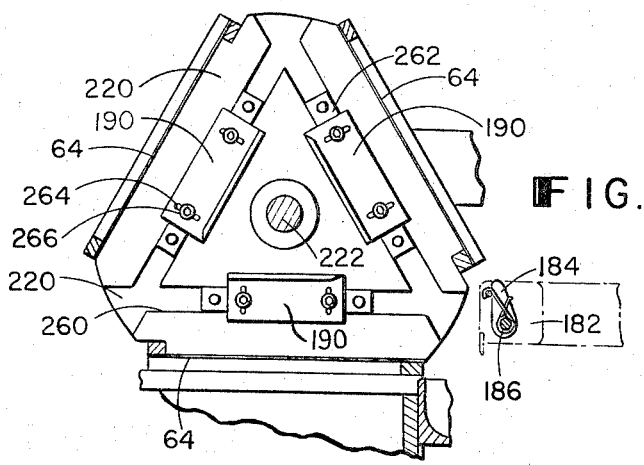
FIG. 14 is an elevation at the inner side of one end of the rotary stencil support showing a fragmentary portion of the work support and the combined applicator and doctor in dotted lines.

The combined applicator and doctor 6 (FIG. 10) comprises a bar 167 containing a transversely extending passage 168 of circular cross-section which is supplied with the coating material through a threaded inlet opening 170 from a coupling member 172 (FIG. 1) connected thereto by a double-threaded nipple 174. A flexible conductor 176 is connected at one end to the coupling member 172 and extends rearwardly therefrom to some convenient source of coating material, such as a pump or a reservoir containing a body of coating material under pressure. Suitable heating elements (not shown) are provided for keeping the coating material liquid at the source and through its delivery to the applicator. A valve rod 178 is mounted in the passage 168 and has along one side a recess 180 for controlling the flow of the coating material. The opposite ends of the bar 167 are closed by cover plates 182 (FIG. 6) and one end of the valve rod 178 extends through the cover plate 182 at that end and has on it an arm 184 (FIGS. 3, 6 and 14). A spring 186 is coiled about the protruding end of the valve rod 178 and has one end fixed to the cover plate 182 and the other end bearing against the arm 184 so as to normally hold the valve rod in such a position that it prevents passage of the coating material to a plurality of transversely spaced orifices 188 extending downwardly from the passage 168 through the underside of the bar. The arm 184 moves forwardly and rearwardly with the combined applicator and doctor and its upper end is located so as to be engaged by a cam bar 190 (FIGS. 6 and 14) to rock the valve rod during the forward movement to a position to permit coating material to be extruded from the orifices 188 at the lower side of the bar 167 and, when moving rearwardly, to block the passage of coating material to the orifices 188. The mounting of the cam bar 190 will be described hereinafter.

Figure 10:
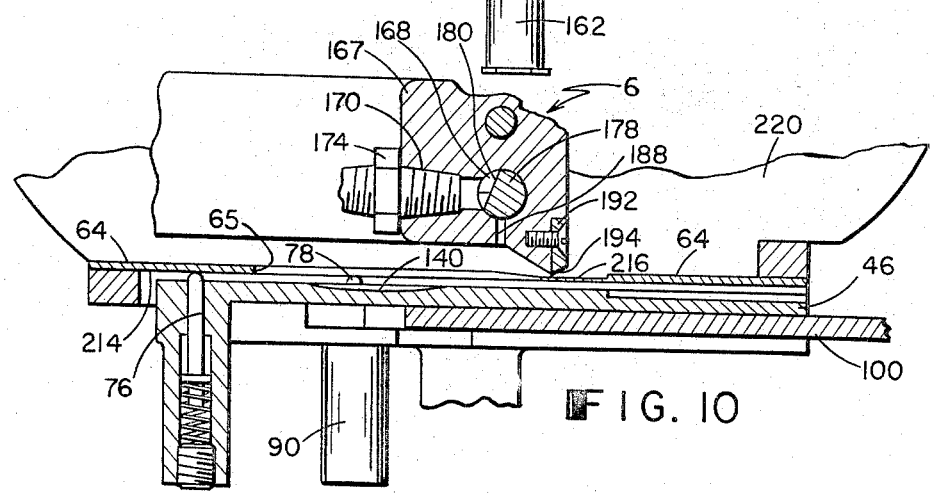
FIG. 10 is a vertical fragmentary section, to much larger scale, taken longitudinally of the machine through the combined applicator and doctor, stencil plate and work support, showing the doctor blade engaged with the stencil plate at the forward side of the stencil opening therein.

The forward end of the bar 167 has a lip projecting downwardly therefrom parallel to the lower ends of the orifices 188 to which there is secured a doctor blade 192, the lower edge of which is beveled as shown at 194 (FIG. 10). This doctor blade, when lowered into engagement with the surface of the stencil plate at the forward end of the reciprocable movement of the combined applicator and doctor blade, will remove the excess or surplus coating material during rearward movement by scraping it from the surface of the plate, but will leave coating material on the work exposed in the stencil opening.

A trough 196, the opposite ends of which are provided with slotted flanges 198 for receiving bolts 200, is secured to the rear side of the bar 75 at the level of the upper surface of the stencil plate to receive the excess coating material scraped from the stencil plate. A coupling block 202 is screwed into the underside of the trough at one end and provides means by which one end of a flexible conductor 204 is connected to the trough. The other end of the conductor 204 is connected to the source of coating material so as to provide for return of the excess to the source.

Figure 12:
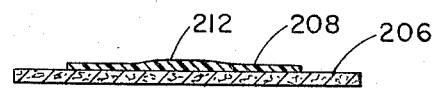
FIG. 12 is a transverse section taken on the line 12—12 of FIG. 11.
Figure 13:
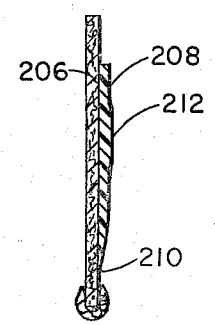
FIG. 13 is a longitudinal section taken on the line 13—13 of FIG. 11.
Figure 11:
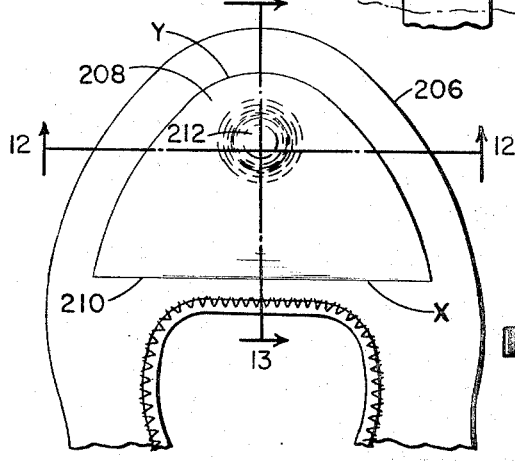
FIG. 11 is a plan view of a shoe part to which the coating has been applied.

The apparatus is designed to apply a coating composition of suitable flexibility and resilience to a shoe part to preserve the shape imparted thereto during lasting and to restore it to its initial shape in spite of repeated crushing, bending, and the like, due to wear, and is particularly designed for applying the coating material to the inside of the forepart 206 of a shoe at the toe, as shown in FIGS. 11, 12 and 13. The area to which the coating is applied is generally toe-shaped, having a substantially straight rear edge X extending transversely of the toe and a substantially symmetrically curved forward edge Y extending forwardly from the rear edge X around the toe substantially parallel to the edge thereof. The coating along the straight edge X is preferably applied relatively thin so as not to show as a ridge on the outer surface of the shoe part when the latter is lasted. FIG. 13, which is a vertical section taken along the front-to-back center line through the shoe part after the application of the coating, shows a gradual increase in thickness from the edge X forwardly toward the tip of the shoe part. Preferably the thickness increases from a feather edge at X to substantially the full thickness within about one-third of the way from the feather edge forwardly. The remainder of the coating 208 is of substantially uniform thickness except for a small area at the tip which is of greater thickness. This greater thickness is provided to add resilience and permanence substantially at the crown adjacent the tip and is applied in a substantially circular area as shown at 212 (FIG. 13). To achieve the aforesaid difference in thickness of the coating, the stencil plate 64, as shown in FIG. 10, has a flat bottom surface 214 and a recess 216 in its upper surface adjacent the forward edge of the opening 65 which reduces the thickness of the plate at this forward edge. The bottom of the recess decreases in depth as it extends rearwardly and merges with the upper surface of the plate at approximately one-third the distance between the forward edge and the rear edge of the opening 65. The work-supporting plate, in turn, contains a shallow concave recess 140, previously referred to, which is substantially circular and is located near the rear end of the work-supporting plate so as to be subjacent the tip of the shoe part resting on the support. The rear side of the recess 140 is somewhat nodular so as to more nearly parallel the edges of the shoe part at each side of the tip. The recessing of the stencil plate and of the work-supporting plate controls the thickness of the coating material applied to the work piece so that the coating is thin at the rear side of the toe, increases in thickness toward the tip and is reinforced adjacent the tip by a spot of still greater thickness. The surface of the stencil plate on which the doctor rests guides the doctor so that it removes the excess coating material, leaving the amount desired to provide the changes in thickness throughout the applied coating. The recess 140 permits the shoe part to be depressed as the doctor blade passes over it sufficiently to add the spot increase in thickness.

Usually the forepart of the upper around the foot opening is bound and the recess 138 in the work-supporting plate, heretofore mentioned, is provided to receive this added thickness of the upper, so that when the work supporting plate is moved underneath the stencil plate the bound edge will not interfere with moving the work piece up into engagement with the underside of the stencil plate.

The stencil-supporting rotor 4 is comprised of two spaced parallel flat end plates 220 (FIGS. 1, 14 and 15) of generally triangular shape, to which the stencil plates 64 are secured. The plates 220 are mounted on a shaft 222, the later being supported at its opposite ends in vertically disposed slots 224 formed in transversely spaced, perpendicular posts 226 bolted to the walls of the casting 26. The stencil-supporting rotor 4 is adapted to be rotated about the axis of the shaft 222 to bring one of the three stencil plates 64 at a time into parallel relation with the upper edges of the casting and hence to the work-supporting plate, and to effect such rotation it is necessary to elevate the rotor to provide clearance. Elevation is provided by a pair of transversely spaced arms 227 pivotally mounted at 288 on transversely spaced, rearwardly extending arms 230 projecting rearwardly from the posts 226. The forward ends of the arms 227 contain slots 232 for receiving the ends of the shaft 222. The rear ends of the arms 227 are connected by a cross-piece 233 and pivotal movement of the arms 227 is provided for by a motor 234 secured in a perpendicular position to a bracket 236, the latter being secured to the arm 230. The motor has a downwardly projecting piston rod 238 secured to a block 240 and the ends of the latter are, in turn, connected to the arms 227 by pins 242 extending through slots 244 in the arms 227.

Figure 15:
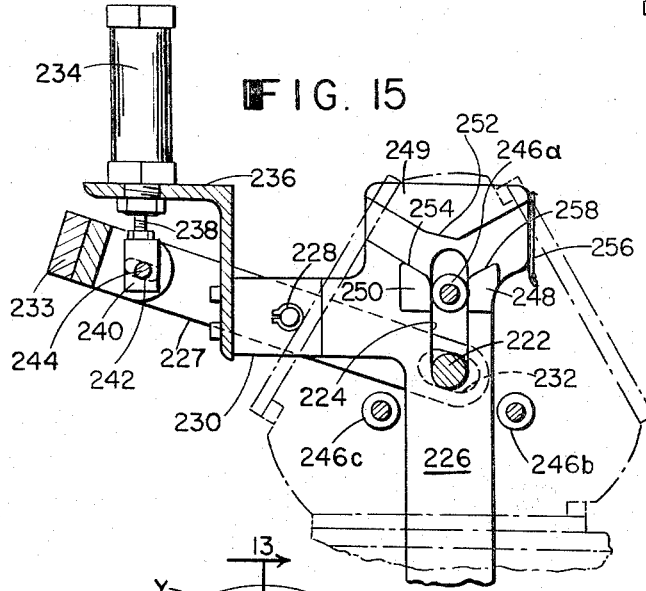
FIG. 15 is an elevation, partly in section, showing the motor for operating the stencil support and the inner side of one of the supports supporting the stencil rotor.

One of the flat plates 220 (FIG. 6) has secured to it three rollers 246a, 246b and 246c which project from the outer side toward the post 226 at that side and the latter has opposite these rollers three cams 248, 249 and 250. When one of the stencil plates is parallel to the work-supporting plate, one of the rollers 246a, as shown in FIG. 15, will be situated between the two cam blocks 248 and 250 which will thereby operate to prevent rotation of the stencil-supporting rotor. By rocking the arms 227 to elevate the shaft 222, the roller 246a, located between the cam blocks 248 and 250, will be raised into engagement with the cam block 249 and the latter is provided with an inclined surface 252 which will guide the cam roller 246a upwardly along the inclined surface 254 of the cam block 250 to the left, as shown in FIG. 15. A leaf spring 256 is secured to the post opposite the outer side of the cam block 248, so that as the cam roller 246b rises upwardly along the outer side of the cam 248 it deflects the spring and when it clears the upper edge of the cam block it will be pushed over the shoulder onto the downwardly inclined upper side thereof and simultaneously will push the roller 246a over the shoulder of the cam block 250. As the arms 226 are now lowered to lower the shaft, the roller 246b will move down the inclined surface 258 of the cam block 248 and into the slot between the cam blocks and the cam roller 246a will move down the outer side of the cam block 250. Thus, the stencil-supporting rotor will be rotated 120° to bring one of the other stencil plates into position. The motor 234 may be supplied with pressure to effect rocking of the arms by way of a manually operable valve.

The plate 220 at the left side of the rotor, when facing the machine, has three slots 260 in its inner side which parallel the respective stencil plates and each slot contains a block 262 to which is fixed, by means of a slot and screw connection 264, 266, a cam plate 190. Thus, for each position of rotation of the rotor to bring a stencil plate into parallel relation to the work support, a cam will be moved into position to effect operation of the arm controlling the supply of coating material to the applicator.

Operation of the apparatus is initiated by a treadle bar 268 (FIGS. 1 and 7) at the base of the machine, pivotally supported at its rear end on a rod 270, the latter being supported between the members 18. The forward end of the treadle bar 268 has a foot plate 272 by means of which it may be depressed and is normally held in an elevated position by a coiled spring 274 connected at one end to the treadle bar 268 and at its other end to the leg 16, engaged with a valve 276. Lowering of the treadle bar actuates the valve 276 to shift a pilot P1 (FIG. 16) in a direction to permit flow of high pressure air from a suitable source S through a conductor C1 and the pilot valve P1, to a transducer T in the form of an orifice connected by a conductor C2 to the manifold 118 to evacuate the latter by aspiration and to thereby lower the pressure at the surface of the work-supporting plate 46 so as to hold the work placed thereon in contact with the plate. Air escapes from the transducer through an exhaust line Exh. The valve 276 is operated by the initial downward movement of the treadle. The pilot valve P1 will remain shifted, as related, until the end of the cycle whereupon the downward movement of the work support by means of a cam 277 shifts the pilot P2 to supply air to the opposite end of the pilot P1 and thereby to shift the latter to its initial position thus cutting off the pressure to the transducer.

Figure 7:
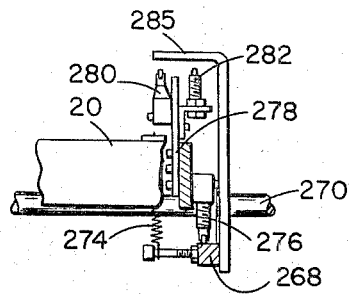
FIG. 7 is a transverse fragmentary section taken on the line 7—7 of FIG. 1.

Continued downward movement of the treadle bar brings the part 285 into contact with a spring-supported detent 282 (FIG. 7) which provides sufficient resistance to downward movement to make the operator aware of the fact that further downward movement will initiate a cycle of operation of the machine by actuation of a valve 280 (FIGS. 1, 7 and 17). Actuation of the valve 280 shifts a pilot P3 to a position to permit pressure from the source S to be delivered to the right-hand end of the cylinder 50 thereby to draw the carriage 36 rearwardly and thus to position the work support beneath the stencil plate. As the carriage moves into position beneath the stencil plate a valve 284 is actuated by a cam 285' depending from the cylinder 72 (FIG. 1) to permit air to flow from the source into the lower end of the cylinder 72 thereby to raise the work-supporting plate into contact with the underside of the stencil plate. Air is also permitted to flow through a valve 286, which is normally held open, to the rear end of the cylinder 158 and thus to move the combined applicator and doctor 6 forwardly. At this time air is exhausted from the cylinder 158 through a valve 287. At the forward extremity of the movement of the combined applicator and doctor blade, a valve 288 is engaged by a cam 289a on the bar 166

(FIG. 1) and this shifts a pilot P4 in a direction to supply pressure to the upper end of the cylinder 162 so as to lower the combined applicator and doctor 6 into engagement with the stencil plate. As the combined applicator and doctor descends, it actuates the valve 287 (FIG. 9) to supply air to the forward end of the cylinder 158 to commence retraction of the applicator and doctor. Downward movement of the combined applicator and doctor lowers a cam bar 289 into a position such that at the end of retraction, a valve 290 is operated to shift the pilot P3 back to its initial position which, in turn, supplies air to the pilot P4 and from thence to the lower end of the cylinder 162 to raise the combined applicator and doctor to its initial position. This exhausts air from the lower end of the cylinder 72 so that the work support drops by gravity. Forward movement of the work support is effected when the pilot P3 is shifted to its initial position by air supplied from the source to the rear end of the cylinder 50.

A stiffening composition such as above-described sets very quickly so that immediately after the liquid has been spread the stiffened vamp may be handled without danger of disturbing the material which has been applied, or having the stiffening material adhere to other objects.

While as above-described the stiffening material is applied directly to the flesh side of the upper at the toe, it is contemplated that the stiffening may be applied to a stiffener piece independent of the upper—this stiffener piece being of any suitable material, for example textile fabric, but being coated with stiffening material in the manner above-described, so as to embody a mound where the stiffening material is thicker than at the marginal portion of the stiffener. Such a stiffener may be employed in the same manner as box-toe stiffeners of conventional type, but because of its thicker layer of stiffening material at its central portion, provides a toe box which does not easily crush.

While the valve rod 178 has been disclosed as being rotated by the cam bar to deposit the coating material on the stencil plate 64 during the forward movement of the doctor 6, it is within the purview of the invention to deposit the coating material at any time prior to the rearward movement of the doctor across the stencil including the period subsequent to the completion of the forward movement of the doctor and prior to the lowering of the doctor. It is also within the purview of this invention to provide a hole in the bottom of the recess 140 that is connected by a pipe to the conduit 128 to thereby provide subatmospheric pressure in the recess to hold the work firmly in the recess during the rearward movement of the doctor 6.

While certain embodiments of the invention have herein been described and illustrated by way of example, it is to be understood that the invention is broadly inclusive of any and all modifications falling within the scope of the appended claims.

I claim:

1. A method of coating a portion of a shoe part with a stiffener having a predetermined contour comprising: providing a stencil plate with a portion having an opening corresponding in shape to said contour; supporting said shoe part so that it is in engagement with the under surface of the stencil plate with said shoe part portion lying beneath said opening; depositing coating material on the upper surface of at least one of said portions; and causing a scraper blade to intersect the deposited material and move across the upper surface of the stencil plate and over the opening while it is bearing against the upper surface of the stencil plate to thereby force the coating material into the opening and cause the coating material to fill the opening and adhere to said shoe part portion.

2. The method as defined in claim 1 further comprising: applying a yieldable downward force to said scraper blade during its aforesaid movement.

3. A method of coating a portion of a shoe part with a stiffener having a predetermined contour and a predetermined non-uniform thickness comprising: providing a stencil plate with a portion having a substantially flat under surface, an opening corresponding in shape to said contour and a section intersecting said opening that has a non-uniform thickness corresponding to the aforesaid thickness of the stiffener; supporting said shoe part so that it is in engagement with the undersurface of the stencil plate with said shoe part portion lying beneath said opening; depositing coating material on the upper surface of at least one of said portions; and causing a scraper blade to intersect the deposited material and move across the upper surface of the stencil plate including said section of non-uniform thickness and over the opening while the blade is bearing against the upper surface of the stencil plate and a yieldable downward force is applied to the scraper blade to thereby force the coating material into the opening and cause the coating material to fill the opening and adhere to said shoe part portion.

4. A method of coating a portion of a shoe part with a stiffener having a predetermined contour and a thickened segment in a predetermined location comprising: supporting said shoe part on a support plate having a substantially flat upper surface which contains a recess corresponding to said thickened segment; providing a stencil plate with a portion having an opening corresponding in shape to said contour; clamping the shoe part between the support plate and the stencil plate so that the shoe part is in engagement with the under surface of the stencil plate with said shoe part portion and said recess lying beneath said opening; depositing coating material on the upper surface of at least one of said portions; and causing a scraper blade to intersect the deposited material and move across the upper surface of the stencil plate and over the opening while it is bearing against the upper surface of the stencil plate to thereby force the coating material into the opening, cause the coating material to fill the opening and adhere to said shoe part portion and cause the segment of the shoe part above the recess to be depressed into the recess to provide said thickened stiffener segment.

5. The method as defined in claim 4 further comprising: applying a yieldable downward force to said scraper blade during its aforesaid movement.

6. A method of coating a portion of a shoe part with a stiffener having a predetermined contour, a predetermined non-uniform thickness and a thickened segment in a predetermined location comprising: supporting said shoe part on a support plate having a substantially flat upper surface which contains a recess corresponding to said thickened segment; providing a stencil plate with a portion having a substantially flat under surface, an opening corresponding in shape to said contour and a section intersecting said opening that has a non-uniform thickness corresponding to the aforesaid thickness of the stiffener; clamping the shoe part between the support plate and the stencil plate so that the shoe part is in engagement with the undersurface of the stencil plate with said shoe part portion and said recess lying beneath said opening; depositing coating material on the upper surface of at least one of said portions; and causing a scraper blade to intersect the deposited material and move across the upper surface of the stencil plate including said section of non-uniform thickness and over the opening while the blade is bearing against the upper surface of the stencil plate and a yieldable downward force is applied to the scraper blade to thereby force the coating material into the opening, cause the coating material to fill the opening and adhere to said shoe part portion and cause the segment of the shoe part above the recess to be depressed into the recess to provide said thickened stiffener segment.

7. An apparatus for coating a portion of a shoe part with a stiffener having a predetermined contour comprising: a stencil plate with a portion having an opening corresponding in shape to said contour; means for supporting said shoe part so that it is in engagement with the under surface of the stencil plate with said shoe part portion lying beneath said opening; a scraper blade mounted for movement in a path across the upper surface of the stencil plate and over the opening; means for depositing coating material on the upper surface of at least one of said portions within the path of movement of the scraper blade; and means for effecting said movement of the scraper blade while it is bearing against the upper surface of the stencil plate whereby the scraper blade intersects the deposited coating material and forces it into the opening and causes the coating material to fill the opening and adhere to said shoe part portion.

8. The apparatus as defined in claim 7 further comprising: means for applying a yieldable downward force to said scraper blade during its aforesaid movement.

9. An apparatus for coating a portion of a shoe part with a stiffener having a predetermined contour and a predetermined non-uniform thickness comprising: a stencil plate having a substantially flat under surface, a portion having an opening corresponding in shape to said contour and a section intersecting said opening that has a non-uniform thickness corresponding to the aforesaid thickness of the stiffener; means for supporting said shoe part so that it is in engagement with the under surface of the stencil plate with said shoe part portion lying beneath said opening; a scraper blade mounted for movement in a path across the upper surface of the stencil plate including said section of non-uniform thickness and over the opening; means for depositing coating material on the upper surface of at least one of said portions within the path of movement of the scraper blade; means for effecting said movement of the scraper blade; and means for applying a yieldable downward force of the scraper blade against the upper surface of the stencil plate during said movement of the scraper blade; whereby the scraper blade intersects the deposited coating material and forces it into the opening and causes the coating material to fill the opening and adhere to said shoe part portion.

10. An apparatus for coating a portion of a shoe part with a stiffener having a predetermined contour and a thickened segment in a predetermined location comprising: a support plate having a substantially flat upper surface which contains a recess corresponding to said thickened segment for supporting said shoe part; a stencil plate with a portion having an opening corresponding in shape to said contour; means for clamping the shoe part between the support plate and the stencil plate so that the shoe part is in engagement with the under surface of the stencil plate with said shoe part portion and said recess lying beneath said opening; a scraper blade mounted for movement in a path across the upper surface of the stencil plate and over the opening; means for depositing coating material on the upper surface of at least one of said portions within the path of movement of the scraper blade; and means for effecting said movement of the scraper blade while it is bearing against the upper surface of the stencil plate; whereby the scraper blade intersects the deposited coating material and forces it into the opening, causes the coating material to fill the opening and adhere to said shoe part portion and causes the segment of the shoe part above the recess to be depressed into the recess to provide said thickened stiffener segment.

11. The apparatus as defined in claim 10 further comprising: means for applying a yieldable downward force to said scraper blade during its aforesaid movement.

12. An apparatus for coating a portion of a shoe part with a stiffener having a predetermined contour, a predetermined non-uniform thickness and a thickened segment in a predetermined location comprising: a support plate having a substantially flat upper surface which contains a recess corresponding to said thickened segment for supporting said shoe part; a stencil plate having a substantially flat under surface, a portion having an opening corresponding in shape to said contour and a section intersecting said opening that has a non-uniform thickness corresponding to the aforesaid thickness of the stiffener; means for clamping the shoe part between the support plate and the stencil plate so that the shoe part is in engagement with the under surface of the stencil plate with said shoe part portion and said recess lying beneath said opening; a scraper blade mounted for movement in a path across the upper surface of the stencil plate including said section of non-uniform thickness and over the opening; means for depositing coating material on the upper surface of at least one of said portions within the path of movement of the scraper blade; means for effecting said movement of the scraper blade; and means for applying a yieldable downward force of the scraper blade against the upper surface of the stencil plate during said movement of the scraper blade; whereby the scraper blade intersects the deposited coating material and forces it into the opening, causes the coating material to fill the opening and adhere to said shoe part portion and causes the segment of the shoe part above the recess to be depressed into the recess to provide said thickened stiffener segment.

13. An apparatus for coating a portion of a shoe part with a stiffener having a predetermined contour comprising: a stencil plate with a portion having an opening corresponding in shape to said contour; means for supporting said shoe part so that it is in engagement with the under surface of the stencil plate with said shoe part portion lying beneath said opening; an applicator-scraper tool; at least one downwardly directed orifice in said tool; means connecting the orifice to a source of coating material under pressure; a valve means in the tool so constructed as to normally block the egress of coating material through the orifice; a downwardly projecting scraper blade on the tool; means mounting the tool for forward and rearward movement and for heightwise movement; means for initially locating the tool in a rearward position with respect to the stencil plate and at a higher elevation than the stencil plate; means for imparting forward movement to the tool over the stencil plate; means for thereafter lowering the tool under a yieldable force to cause the scraper blade to bear against the upper surface of the stencil plate; means operative as a concomitant of the movement of the tool and prior to the lowering of the tool to shift the valve to unblock the orifice and thereby cause coating material to egress through the orifice and be deposited on at least one of said portions; and means for imparting rearward movement to the tool while maintaining it under said yieldable force whereby the scraper blade intersects the deposited coating material and forces it into the opening and causes the coating material to fill the opening and adhere to said shoe part portion.

14. An apparatus for coating a portion of a shoe part with a stiffener having a predetermined contour comprising: a stencil plate with a portion having an opening corresponding in shape to said contour; means for supporting said shoe part so that it is in engagement with the under surface of the stencil plate with said shoe part portion lying beneath said opening; an applicator-scraper tool; at least one downwardly directed orifice in said tool; a downwardly projecting scraper blade on the tool; an inlet in said tool; means connecting the inlet to a source of coating material under pressure; a valve movably mounted in said tool and interposed between said orifice and said inlet; spring means yieldably urging the valve to a position wherein it blocks the passage of coating material from the inlet to the orifice; a downwardly projecting scraper blade on the tool; means mounting the tool for forward and rearward movement and for heightwise movement; means for initially locating the tool in a rearward position with respect to the stencil plate and at a higher elevation than the stencil plate; means for imparting forward movement to the tool over the stencil plate; a cam so located as to be intersected by the valve during the forward movement of the tool and shift the valve against the force of the spring means to thereby unblock the passage of coating material from the inlet to the orifice so that coating material egresses through the orifice and is deposited on at least one of said portions; means for lowering the tool under a yieldable force after it has completed its forward movement to cause the scraper blade to bear against the upper surface of the stencil plate and to enable the valve to escape the cam so that the spring means returns the valve to blocking position; and means for imparting rearward movement to the tool while maintaining it under said yieldable force whereby the scraper blade intersects the deposited coating material and forces it into the opening and causes the coating material to fill the opening and adhere to said shoe part portion.

15. An apparatus for coating a portion of a shoe part with a stiffener having a predetermined contour comprising: a support plate, for supporting said shoe part, mounted for heightwise movement; means for initially maintaining the support plate in a lowered position; a stencil plate, located above the support plate, with a portion having an opening corresponding in shape to said contour; means for raising the support plate to clamp the shoe part between the suport plate and the stencil plate so that the shoe part is in engagement with the undersurface of the stencil plate with said shoe part portion lying beneath said opening; a scraper blade mounted for movement in a path across the upper surface of the stencil plate and over the opening; means for depositing coating material on the upper surface of at least one of said portions within the path of movement of the scraper blade; and means for effecting said movement of the scraper blade while it is bearing against the upper surface of the stencil plate whereby the scraper blade intersects the deposited coating material and forces it into the opening and causes the coating material to fill the opening and adhere to said shoe part portion.

16. The apparatus as defined in claim 15 further comprising: gauge means on the support, extending upwardly of the support plate, for locating the shoe part on the support plate; and means for yieldably urging the gauge means upwardly so that the gauge means may depress downwardly of the support plate upon engaging the stencil plate during the rise of the support plate.

17. The apparatus as defined in claim 15 further comprising: at least one hold in the support plate; and means connecting the hole to a source of suction to thereby hold the shoe part on the support plate.

18. An apparatus for coating a portion of a shoe part with a stiffener having a predetermined contour comprising: a support plate, for supporting said shoe part, mounted for forward and rearward movement and for heightwise movement; means for initially maintaining the support plate in a lowered forward position; a stencil plate, located above the support plate and rearwardly of the initial position of the support plate, with a portion having an opening corresponding in shape to said contour; means for moving the support plate rearwardly to place it beneath the stencil plate; means for thereafter raising the support plate to clamp the shoe part between the support plate and the stencil plate so that the shoe part is in engagement with the undersurface of the stencil plate with said portion lying beneath said shot part opening; a scraper blade mounted for movement in a path across the upper surface of the stencil plate and over the opening; means for depositing coating material on the upper surface of at least one of said portions within the path of movement of the scraper blade; and means for effecting said movement of the scraper blade while it is bearing against the upper surface of the stencil plate whereby the scraper blade intersects the deposited coating material and forces it into the opening and causes the coating material to fill the opening and adhere to said shoe part portion.

19. An apparatus for coating a portion of a shoe part with a stiffener having a predetermined contour comprising: a support plate having an upper surface adapted to support the shoe part; a first centrally located gauge pin extending upwardly of the support plate; a pair of second gauge pins extending upwardly of the support plate and located forwardly of the first pin on opposite sides of the first pin; said pins being adapted to bear against the shoe part to locate the shoe part on the support plate; means mounting each of said second pins for transverse movement along the support plate toward and away from each other to thereby position the second pins in predetermined locations on the support plate; a stencil plate located above the support plate with a portion having an opening corresponding in shape to said contour; means for clamping the shoe part between the support plate and the stencil plate so that the shoe part is in engagement with the undersurface of the stencil plate with said shoe part portion lying beneath said opening, the positioning of said second pins being determinative of the shoe part portion lying beneath said opening; a scraper blade mounted for movement in a path across the upper surface of the stencil plate and over the opening; means for depositing coating material on the upper surface of at least one of said portions within the path of movement of the scraper blade; and means for effecting said movement of the scraper blade while it is bearing against the upper surface of the stencil plate whereby the scraper blade intersects the deposited coating material and forces it into the opening and causes the coating material to fill the opening and adhere to said shoe part portion.

20. An apparatus for coating a portion of a shoe part having a convex periphery with a stiffener having a predetermined contour comprising: a support plate having an upper surface adapted to support the shoe part with said convex periphery extending rearwardly; a first centrally located gauge pin extending upwardly of the support plate; a pair of second gauge pins extending upwardly of the support plate and located forwardly of the first pin on opposite sides of the first pin; said pins being adapted to bear against the shoe part and locate the shoe part on the support plate; means mounting each of said second pins for movement along the support plate in directions that diverge rearwardly to thereby position the second pins in predetermined locations on the support plate; a stencil plate located above the support plate with a portion having an opening corresponding in shape to said contour; means for clamping the shoe part between the support plate and the stencil plate so that the shoe part is in engagement with the undersurface of the stencil plate with said shoe part portion lying beneath said opening the positioning of said second pins being determinative of the shoe part portion lying beneath said opening; a scraper blade mounted for movement in a path across the upper surface of the stencil plate and over the opening; means for depositing coating material on the upper surface of at least one of said portions within the path of movement of the scraper blade; and means for effecting said movement of the scraper blade while it is bearing against the upper surface of the stencil plate whereby the scraper blade intersects the deposited coating material and forces it into the opening and causes the coating material to fill the opening and adhere to said shoe part portion.

21. The apparatus as defined in claim 20 wherein the mounting for said second pins comprises: a cam mounted beneath the support plate for forward and rearward movement; rearwardly convergent side surfaces on the cam; a pair of rearwardly divergent slides in the support plate on opposite sides of the cam; means yieldably urging each of said slides against a cam side surface; and means mounting each of said second pins in one of the slides.

22. An apparatus for coating a portion of a shoe part with a stiffener having a predetermined contour comprising: a turret, mounted for rotation about a horizontal axis, having a plurality of stencil plates mounted thereon at equal angular distances with a first one of said stencil plates lying below said axis; a portion having an opening in each of said stencil plates corresponding in shape to the desired contour of the stiffener; means for supporting said shoe part so that it is in engagement with the undersurfaces of said first stencil plate with said shoe part portion lying beneath the opening of the first stencil plate; a scraper blade mounted for movement in a path across the upper surface of the first stencil plate and over the opening of the first stencil plate; means for depositing coating material on the upper surface of at least one of said shoe part and first stencil plate portions within the path of movement of the scraper blade; means for effecting said movement of the scraper blade while it is bearing against the upper surface of the first stencil plate whereby the scraper blade intersects the deposited coating material and forces it into the first stencil plate opening and causes the coating material to fill the opening and adhere to said shoe part portion; drive means operative to raise and lower the turret axis; means responsive to the rise of the turret axis to first translate the turret upwardly and then swing the turret in a predetermined direction about said axis an angle that is equal to half of said angular distances; and means responsive to the lowering of the turret to first swing the turret in said predetermined direction about said axis an angle that is equal to half of said angular distances and then to translate the turret downwardly; whereby a second one of said stencil plates is brought to the position formerly occupied by said first stencil plate and the aforesaid operations of depositing and scraping the coating material may be repeated in cooperation with the second stencil plate.

23. An indexing mechanism comprising: a turret, mounted for rotation about a horizontal axis, having a plurality of plates mounted thereon at equal angular distances with a first one of said plates lying below said axis; drive means operative to raise and lower the turret axis; means responsive to the rise of the turret axis to first translate the turret upwardly and then swing the turret in a predetermined direction about said axis an angle that is qual to half of said angular distances; and means responsive to the lowering of the turret axis to first swing the turret in said predetermined direction about said axis an angle that is equal to half of said angular distances and then to translate the turret downwardly; whereby a second one of said plates is brought to the position formerly occupied by said first plate.

24. An indexing mechanism comprising: a pair of spaced posts; a shaft extending between the posts on a horizontal axis and mounted for heightwise movement in the posts; a turret, mounted for rotation about the shaft, having a plurality of peripheral plates thereon at equal angular distances with a first one of said peripheral plates lying below said shaft; an end plate on one end of the turret located adjacent a first one of said posts; drive means operative to raise and lower the shaft; and cooperative cams and cam followers on said end plate and said first post so constructed and arranged as to first translate the turret upwardly and then swing the turret in a predetermined direction about said shaft an angle that is equal to half of said angular distances during the rise of the shaft and to first swing the turret in said predetermined direction about said shaft an angle that is equal to half of said angular distances and then to translate the turret downwardly during the lowering of the shaft; whereby a second one of said peripheral plates is brought to the position first occupied by said first peripheral plate.

References Cited
UNITED STATES PATENTS

| | | | |
|---|---|---|---|
| 562,516 | 6/1896 | Evans | 269—233 X |
| 1,227,617 | 5/1917 | Hodgson | 118—2 |
| 1,456,525 | 5/1923 | West | 269—233 X |
| 1,756,998 | 5/1930 | Walker | 118—2 |
| 1,885,453 | 11/1932 | Larson | 118—2 |
| 1,889,986 | 12/1932 | Haywood | 269—233 X |

ALFRED L. LEAVITT, *Primary Examiner.*

A. M. GRIMALDI, *Assistant Examiner.*